(12) United States Patent
Kowalski et al.

(10) Patent No.: US 11,005,317 B2
(45) Date of Patent: May 11, 2021

(54) ROTOR BODY AND METHOD FOR PRODUCING A ROTOR BODY

(71) Applicant: Siemens Aktiengesellschaft, Munich (DE)

(72) Inventors: Matthias Kowalski, Mülheim an der Ruhr (DE); Christoph Lehmann, Neukirchen-Vluyn (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 240 days.

(21) Appl. No.: 16/099,016

(22) PCT Filed: Apr. 18, 2017

(86) PCT No.: PCT/EP2017/059118
§ 371 (c)(1),
(2) Date: Nov. 5, 2018

(87) PCT Pub. No.: WO2017/194271
PCT Pub. Date: Nov. 16, 2017

(65) Prior Publication Data
US 2019/0157926 A1 May 23, 2019

(30) Foreign Application Priority Data
May 9, 2016 (EP) .................... 16168702

(51) Int. Cl.
*H02K 15/02* (2006.01)
*H02K 15/10* (2006.01)
(Continued)

(52) U.S. Cl.
CPC ............... *H02K 1/26* (2013.01); *H02K 1/24* (2013.01); *H02K 3/42* (2013.01); *H02K 15/024* (2013.01); *H02K 1/02* (2013.01)

(58) Field of Classification Search
CPC .. H02K 1/26; H02K 1/24; H02K 3/42; H02K 15/024; H02K 1/02; H02K 29/49012
(Continued)

(56) References Cited

U.S. PATENT DOCUMENTS 5,296,773 A * 3/1994 El-Antably ............ H02K 1/246
310/106
7,102,259 B2 * 9/2006 Kawaguchi ............ H02K 1/246
310/166
(Continued)

FOREIGN PATENT DOCUMENTS

| DE | 1814383 A1 | 12/1969 |
|---|---|---|
| GB | 1183630 A | 3/1970 |
| GB | 1403522 A | 8/1975 |

OTHER PUBLICATIONS

European Search Report and Written Opinion dated Oct. 27, 2016, Application-No. 16168702.
(Continued)

*Primary Examiner* — Donghai D Nguyen

(57) ABSTRACT

A rotor body for a rotor of a rotating electric machine, in particular a turbogenerator, has at least one pole axis extending perpendicularly to a longitudinal center axis of the rotor body. At least one section of the rotor body has at least two layers produced from different materials, which layers are arranged in alternation, wherein the materials differ from each other with respect to the electrical conductivity thereof. A layer sequence direction of a layer structure formed by the layers extends perpendicularly to the pole axis and to the longitudinal center axis.

5 Claims, 2 Drawing Sheets

(51) Int. Cl.
*H02K 1/26* (2006.01)
*H02K 1/24* (2006.01)
*H02K 3/42* (2006.01)
*H02K 1/02* (2006.01)

(58) Field of Classification Search
USPC .......................................................... 29/598
See application file for complete search history.

(56) References Cited

U.S. PATENT DOCUMENTS

| | | | |
|---|---|---|---|
| 9,219,387 B2* | 12/2015 | Kolehmainen | ........ H02K 1/246 |
| 2003/0090170 A1 | 5/2003 | Yoshino et al. | |
| 2015/0171673 A1* | 6/2015 | Cioffi | ..................... H02K 1/246 |
| | | | 29/598 |

OTHER PUBLICATIONS

PCT International Search Report and Written Opinion of International Authority dated Jun. 12, 2017 corresponding to PCT International Application No. PCT/EP2017/059118 filed Apr. 18, 2017.

\* cited by examiner

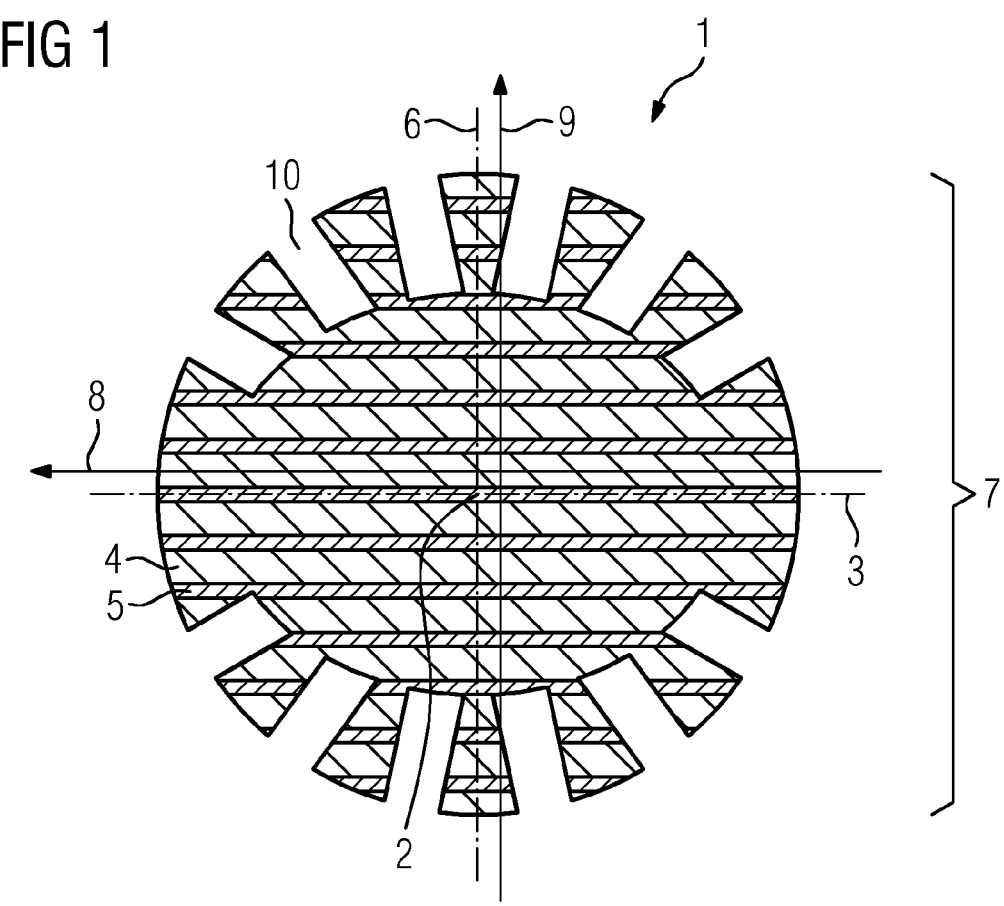

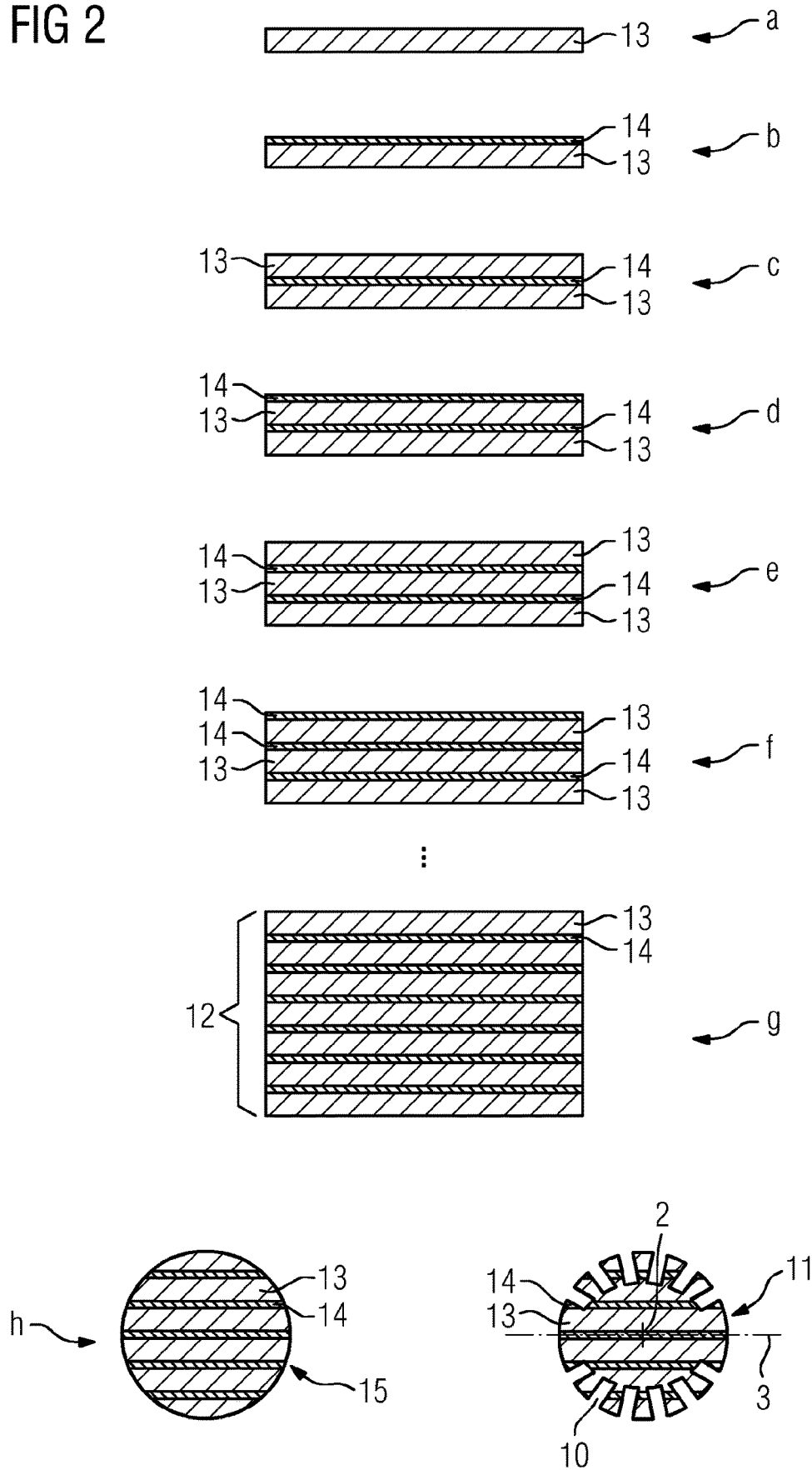

ROTOR BODY AND METHOD FOR PRODUCING A ROTOR BODY

CROSS REFERENCE TO RELATED APPLICATIONS

This application is the US National Stage of International Application No. PCT/EP2017/059118 filed Apr. 18, 2017, and claims the benefit thereof. The International Application claims the benefit of European Application No. EP16168702 filed May 9, 2016. All of the applications are incorporated by reference herein in their entirety.

FIELD OF INVENTION

The invention relates to a rotor body for a rotor of a rotating electrical machine, in particular of a turbogenerator, having at least one pole axis running perpendicular to a longitudinal center axis of the rotor body.

The invention furthermore relates to a method for producing a rotor body for a rotor of a rotating electrical machine, in particular of a turbogenerator.

BACKGROUND OF INVENTION

A rotating electrical machine comprises a stator and a rotor mounted so as to be able to rotate. The rotor may have a rotor body having axial reception grooves, in each of which a conductor section of a rotor winding of the rotor is arranged. The conductor sections arranged in the reception grooves are electrically conductively connected to one another by way of transverse conductor sections on the end side outside the rotor body, which transverse conductor sections in each case form a rotor winding head on axially opposing sides of the rotor body. The rotor or the rotor body comprises a pole axis running perpendicular to a longitudinal center axis of the rotor body, which pole axis constitutes a connection line between the magnetic poles of the rotor or rotor body. Corresponding refinements in particular ensue in the case of a refinement of a rotating electrical machine in the form of a turbogenerator.

Rotor windings, also called excitation windings, of a turbogenerator are generally applied with a DC current, in particular one specific to the load conditions, such that a specific grid frequency of 50 Hz or 60 Hz is able to be fed into a power grid through rotation of a turbine coupled rigidly to the turbogenerator. A prerequisite for this is that the turbine rotates at 50 Hz or 60 Hz. If only 50 Hz turbines are used, the resulting frequency discrepancy in the case of 60 Hz power grids is able to be concluded by pulsed excitation currents of 10 Hz. One problem that arises in this case is the undesired generation of high eddy currents in the rotor iron or rotor body. This effect is based on the fact that an electrically conductive body, in this case the rotor body, is penetrated by a magnetic flux that changes over time. This induces an electric vortex field that drives currents in the circuit (eddy currents). These eddy currents have a very high current strength as there is normally a very large conductive surface available as conducting path. Enormous losses result from these eddy currents, which losses greatly limit the rotating electrical machine in terms of its efficiency and its usability.

SUMMARY OF INVENTION

One object of the invention is to increase an efficiency and a usability of a rotating electrical machine.

A rotor body according to the invention for a rotor of a rotating electrical machine, in particular of a turbogenerator, comprises at least one pole axis running perpendicular to a longitudinal center axis of the rotor body, wherein at least one section of the rotor body has at least two layers arranged in an alternating manner and produced from different materials, wherein the materials differ from one another in terms of their respective electrical conductivity, and wherein a layer sequence direction of a layer structure formed by the layers runs perpendicular to the pole axis and to the longitudinal center axis.

According to the invention, a layer produced from a metal or a metal alloy, in particular from steel, may serve primarily to conduct the magnetic flux along the pole axis, while the other layer, that differs from this layer in terms of its material, for example made from metal or a metal alloy, in particular steel, suppresses or prevents the electric current transverse to the pole axis and to the longitudinal center axis. The latter layer may be for example a steel having a high silicon content or another additive. The layers are advantageously configured so as to be flat.

The magnetic flux generated in the rotor body is therefore able to flow from one magnetic pole of the rotor body to the other magnetic pole with low resistance. At the same time, electric vortex fields are restricted in terms of their paths inside the rotor body such that the eddy current losses are greatly reduced. This situation results from the fact that the eddy currents always form transverse to magnetic field lines. If the electrical conductivity in such a transverse eddy current plane is now reduced in a manner according to the invention, the eddy currents are greatly reduced. The magnetic conductivity of the layers having the higher electrical conductivity is advantageously as high as possible along the pole axis, whereas the electrical conductivity of the layers having the lower electrical conductivity should have a value that is as low as possible transverse to the pole axis and to the longitudinal center axis. Noteworthy eddy currents form primarily in the regions between two layers having lower electrical conductivity, that is to say in the more magnetically conductive layers having the higher electrical conductivity.

According to the invention, two different materials, in particular steel materials, that is to say steels having different additives, are combined with one another in a targeted manner such that the rotor body is able both to convey the given magnetic flux, that is to say has a high permeability, and is less electrically conductive perpendicular to the pole axis and to the longitudinal center axis as a result of the lower electrical conductivity of the one layer. This lower conductivity of the rotor body or its higher specific electrical resistance in this direction leads to a reduction of eddy current losses in the rotor body.

Both materials should be chosen such that they both withstand the mechanical stresses that arise, wherein one material is in particular highly magnetically conductive and more highly electrically conductive, and the other material in particular has a lower electrical conductivity. When the layers are combined, a directional dependency of the electromagnetic properties of the rotor body is advantageously taken into account. Advantageously, as many layer alternations as possible are present transverse to the pole axis and to the longitudinal center axis. These may also be situated in the microstructure of the material, for example.

By way of the invention, it is possible, in the case of turbogenerators having a pulsed excitation current (excitation field), as described in the introduction, to reduce the eddy currents in the rotor body without for example having to perform conventional axial lamination of the rotor body. This results in better efficiency and higher usability of a corresponding turbogenerator. In addition, a rotor body according to the invention is able to be produced in a more cost-effective manner than a laminated rotor body that is produced with comparatively higher expenditure.

A steel layer having the higher electrical conductivity is advantageously thicker than a steel layer having the lower electrical conductivity. The effects of the thicker steel layers having the higher electrical conductivity on an in particular pulsed magnetic flux are lower, such that the magnetic flux is able to be conducted well through the rotor body. The electrical vortex paths that are produced are additionally greatly limited in terms of their spread, the result of which is a considerable reduction of heat input into the rotor body and of the losses in the rotor body.

A method according to the invention for producing a rotor body for a rotor of a rotating electrical machine, in particular of a turbogenerator, comprises the steps: —producing a multilayer layer structure from at least two layers arranged in an alternating manner and produced from different materials, wherein the materials differ from one another in terms of their respective electrical conductivity; —producing a rotationally symmetrical rotor body blank by machining the layer structure; and —producing the rotor body by forming a plurality of axially running reception grooves arranged in a manner distributed over the circumference on the rotor body blank for receiving in each case one conductor section of a rotor winding of the rotor, wherein the reception grooves are formed on the rotor body blank such that the rotor body has a pole axis running perpendicular to a longitudinal center axis of the rotor body, which pole axis runs parallel to the layers.

The advantages mentioned above with reference to the rotor body are accordingly linked with the method. In particular, in one of its refinements or any desired combination of at least two of these refinements with one another, the rotor body is able to be produced using the method.

The different materials are advantageously different metals or different metal alloys, in particular different steel materials, that is to say steels having different additives. When producing the multilayer layer structure, the individual layers are advantageously connected to one another in a bonded and areal manner. The layers are advantageously configured so as to be flat.

To produce the rotationally symmetrical rotor body blank, turning may be used as a machining manufacturing method, for example. It is also possible however to perform machining of the rotor body blank in another way.

The reception grooves of the rotor body are arranged in a manner distributed unevenly on the circumference on the rotor body. In particular, no reception grooves are arranged on the rotor body in the region of each magnetic pole of the rotor body. The reception grooves run parallel to the longitudinal center axis of the rotor body. The reception grooves may be formed for example by milling the rotor body blank.

By way of the method, a situation is thus able to be achieved whereby the electrical conductivity is reduced transverse to the pole axis and to the longitudinal center axis and the magnetic conductivity is maintained in a manner as unrestricted as possible parallel to the pole axis. Therefore, when forming the reception grooves in the production process, attention has to be paid to the alignment of the layer structure. In particular, the reception grooves have to be positioned such that the pole axis running perpendicular to the longitudinal center axis runs parallel to the layers.

The multilayer layer structure is advantageously produced by a forging process. By way of example, layers having a lower electrical conductivity may already be incorporated during a forging process. A continuous arrangement of the layers having lower electrical conductivity, running completely through the rotor body, is not absolutely necessary, but may be implemented. To produce the layer structure, a thin steel layer having lower electrical conductivity may first of all be applied to a heated steel layer having higher electrical conductivity and very high magnetic permeability, for example. During the forging process, a plurality of such layers having lower electrical conductivity may be introduced between ferromagnetic steel layers having higher electrical conductivity. Alternating layering of the highly magnetic steel layers and of the special steel layers having lower electrical conductivity with a higher number of layers boosts the effect according to the invention.

The multilayer layer structure is advantageously produced by fold-forging. In this case, a material having the two different layers may be stretched by a forging hammer. The stretched two-layer workpiece thus produced may then be divided. A workpiece section separated in the division may then be folded over and thereby arranged on the other workpiece section. This folding procedure is repeated until the desired number of layers is achieved, wherein the number of layers doubles with each fold.

BRIEF DESCRIPTION OF THE DRAWINGS

The invention is explained by way of example below with reference to the attached figures on the basis of advantageous embodiments, wherein the features depicted below may constitute an aspect of the invention both taken alone and in different combinations with one another. In the figures:

FIG. 1 shows a schematic cross-sectional depiction of one exemplary embodiment for a rotor body according to the invention; and FIG. 2 shows a schematic depiction of one exemplary embodiment for a method according to the invention.

DETAILED DESCRIPTION OF INVENTION

FIG. 1 shows a schematic cross-sectional depiction of one exemplary embodiment for a rotor body 1 according to the invention for a rotor of a rotating electrical machine in the form of a turbogenerator.

The rotor body 1 comprises a pole axis 3 running perpendicular to a longitudinal center axis 2 of the rotor body 1. The entire rotor body 1 additionally comprises two flat steel layers 4 and 5 arranged in an alternating manner and produced from different steel materials. The steel materials differ from one another in terms of their respective electrical conductivity. A layer sequence direction 6 of a layer structure 7 formed by the steel layers 4 and 5 runs perpendicular to the pole axis 3 and to the longitudinal center axis 2. The steel layers 4 having the higher electrical conductivity are thicker than the steel layers 5 having the lower electrical conductivity. The rotor body 1 is highly magnetically conductive parallel to the pole axis 3, in accordance with the arrow 8, and less electrically conductive than parallel to the pole axis 3 perpendicular to the pole axis 3 and to the longitudinal center axis 2, in accordance with the arrow 9.

A plurality of axially running reception grooves 10 for receiving in each case a conductor section, not shown, of a rotor winding of the rotor are furthermore arranged in a manner distributed over the circumference on the rotor body 1. The reception grooves 10 are arranged in a manner unevenly distributed over the circumference on the rotor body 1, such that the rotor body 1 includes the pole axis 3 running perpendicular to the longitudinal center axis 2, which pole axis runs parallel to the steel layers 4 and 5.

FIG. 2 shows a schematic depiction of one exemplary embodiment for a method according to the invention for producing a rotor body 11 for a rotor of a rotating electrical machine in the form of a turbogenerator. The produced rotor body 11 is depicted in cross section in step i) of FIG. 2.

A multilayer layer structure 12 made from two steel layers 13 and 14 arranged in an alternating manner and produced from different steel materials is first of all produced, wherein the steel materials differ from one another in terms of their respective electrical conductivity. For this purpose, a flat steel layer 13 having higher electrical conductivity is first of all provided (step a)). In a next step b), a thinner flat steel layer 14 having lower electrical conductivity is applied to the steel layer 13. In a next step c), a thicker flat steel layer 13 having higher electrical conductivity is again applied to the steel layer 14. In a next step d), a further thinner flat steel layer 14 having lower electrical conductivity is applied to the last steel layer 13. In a next step e), a thicker flat steel layer 13 having higher electrical conductivity is again applied to the last steel layer 14. In a next step f), a further thinner flat steel layer 14 having lower electrical conductivity is applied to the last steel layer 13. Such layering steps are repeated until the last steel layer 13 has been applied to the penultimate steel layer 14 in the last step g). The layer structure 12 is thereby produced.

In a step h), a rotationally symmetrical rotor body blank 15 is produced by machining, for example turning, of the layer structure 12.

In step i), the rotor body 11 is produced by forming a plurality of axially running reception grooves 10, arranged in a manner distributed over the circumference on the rotor body blank 15, for receiving in each case one conductor section, not shown, of a rotor winding of the rotor. The reception grooves 10 are formed on the rotor body blank 15 such that the rotor body 11 has a pole axis 3 running perpendicular to a longitudinal center axis 2 of the rotor body 11, which pole axis runs parallel to the steel layers 13 and 14. The multilayer layer structure 12 may in this case be produced by a forging process. By way of example, the multilayer layer structure 12 may be produced by fold-forging.

Although the invention has been described and illustrated in more detail by way of the preferred exemplary embodiments, the invention is not restricted by the disclosed examples, and other variations may be derived herefrom by a person skilled in the art without departing from the scope of protection of the invention.

The invention claimed is:

1. A rotor body for a rotor of a rotating electrical machine, in particular of a turbogenerator, comprising:
    at least one pole axis running perpendicular to a longitudinal center axis of the rotor body, wherein at least one section of the rotor body has at least two layers arranged in an alternating manner and produced from different materials,
    wherein the materials differ from one another in terms of their respective electrical conductivity,
    wherein a layer sequence direction of a layer structure formed by the layers runs perpendicular to the pole axis and to the longitudinal center axis,
    wherein the rotor body is highly magnetically conductive parallel to the pole axis,
    wherein the rotor body forms a plurality of axially running reception grooves arranged and distributed over the circumference of a rotor body blank to receive a respective conductor section of a rotor winding of the rotor, and
    wherein the reception grooves are formed on the rotor body blank such that the rotor body has a pole axis running perpendicular to a longitudinal center axis of the rotor body and that runs parallel to the layer.

2. The rotor body as claimed in claim 1,
    wherein the layer having a higher electrical conductivity is thicker than the layer) having the lower electrical conductivity.

3. A method for producing a rotor body for a rotor of a rotating electrical machine, or a turbogenerator, the method comprising:
    producing a multilayer layer structure from at least two layers arranged in an alternating manner and produced from different materials, wherein the materials differ from one another in terms of their respective electrical conductivity;
    producing a rotationally symmetrical rotor body blank by machining the layer structure; and
    producing the rotor body by forming a plurality of axially running reception grooves arranged in a manner distributed over the circumference on the rotor body blank for receiving in each case one conductor section of a rotor winding of the rotor, wherein the reception grooves are formed on the rotor body blank such that the rotor body has a pole axis running perpendicular to a longitudinal center axis of the rotor body, which pole axis runs parallel to the layers.

4. The method as claimed in claim 3,
    wherein the multilayer layer structure is produced by a forging process.

5. The method as claimed in claim 4,
    wherein the multilayer layer structure is produced by fold-forging.

* * * * *